July 15, 1958 G. L. ROGERS 2,843,401
BAYONET SLOT COUPLING PROVIDED WITH BALL ANTI-FRICTION
MEANS ALSO SLEEVE MANIPULATION
Filed Aug. 29, 1957

INVENTOR.
GERALD L. ROGERS
BY Cohn and Powell
ATTORNEY

United States Patent Office 2,843,401
Patented July 15, 1958

2,843,401

BAYONET SLOT COUPLING PROVIDED WITH BALL ANTI-FRICTION MEANS ALSO SLEEVE MANIPULATION

Gerald L. Rogers, Olivette, Mo., assignor to Stile-Craft Manufacturers, Inc., a corporation of Missouri Application August 29, 1957, Serial No. 681,002

16 Claims. (Cl. 285—82)

This invention relates generally to an improved coupling, and more particularly to improvements in couplings of the type which permit quick connection and separation of fluid lines and apparatus served thereby.

It is an important object of the invention to provide a coupling which includes an improved mechanism for detachable connecting the cooperating male and female members, and for selectively latching the actuating part to preclude unintentional detachment of such members.

Another important object is realized in the provision of a particularly shaped groove in the socket portion of the female member, and by the provision of a ball means carried by and movable with the actuating sleeve of the connecting mechanism, the ball means being guided in the groove to effect attachment and detachment of the coupling member and to condition selectively the mechanisms to preclude unintentional detachment.

Still another important object is realized by the mounting and connection of ball elements on the socket portion of the female member and on the slidably mounted sleeve of the actuating mechanism so that the ball elements engage as bearing surfaces upon relative rotative movement of the sleeve to a latched position.

Yet another important objective is realized by the structural arrangement of the coacting balls carried by the socket portion and the sleeve which assures bearing engagement when the sleeve is rotated.

Other important advantages are afforded by the provision of a resilient means disposed operatively between the female member and the sleeve which tends to urge the sleeve, and hence the ball carried therewith, in a direction so that under normal connected conditions of such members, the balls are disposed in overlapping relation and are adapted to engage as bearing surfaces under loading of the resilient means upon rotation of the sleeve as one ball is transported into and out of the latch groove portion.

Another important object is achieved by the above mentioned structural arrangement in that the resilient means tends to maintain the balls in relative overlapping position when the sleeve-carried ball is located in the latch groove portion, whereby to hold the sleeve selectively in latched position.

Another important objective is achieved by the structural arrangement of the locking elements and the cooperating parts on the actuating sleeve, and by the structural and functional relation of the ball means and the T-shaped groove of the selectively operable latch mechanisms, so that the sleeve-carried ball must be moved in the longitudinal groove portion rearwardly of the latch groove portion in order to cause effective release of the locking elements from the connected male member.

The foregoing and numerous other objects and advantages of the invention will more clearly appear from the following detailed description of a preferred embodiment, particularly when considered in connection with the accompanying drawing, in which.

Figure 1:
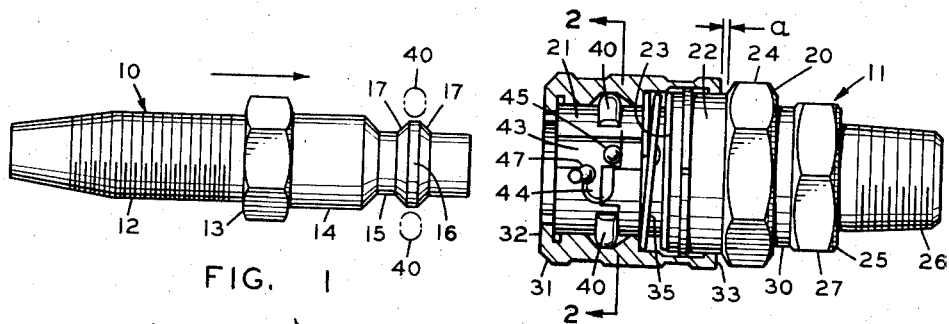
Fig. 1 is a side elevational view of the male and female members of the coupling, showing such members disconnected, the female member being shown partly in cross section to illustrate the connecting and latching mechanisms.

Referring now by characters of reference to the drawing, it is seen that the fluid line coupling consists of two separable parts; a male member generally indicated at 10 and a female member referred to at 11.

The male member 10 is of a tubular type, and includes a threaded portion 12, an integral nut 13, and a nipple portion 14 that normally extends into female member 11. An annular or peripheral groove 15 is formed in nipple portion 14, and a camming flange 16 is located immediately ahead of groove 15, the flange 16 being defined by outwardly converging and sloping shoulders 17.

The female member 11 includes a tubular fitting 20 consisting of a forward socket portion 21, and a relatively enlarged portion 22 that provides a forwardly facing abutment shoulder 23, and an integral nut 24.

Detachably connected to tubular fitting 20 is a tubular valve fitting 25 consisting of a threaded rear portion 26, an integral nut 27, and a threaded forward portion 30 which is adapted to be received and connected internally to the tubular fitting 20 of the female member 11. A valve mechanism (not shown) which may be and is of the conventional form used in couplings of this type is located internally of valve fitting 25, such valve mechanism being opened automatically upon engagement with the end of nipple portion 14 incident to insertion of the male member 10, and being automatically closed upon detachment of member 10 and removal of nipple portion 14.

Slidably mounted on socket portion 21 and on enlarged portion 22 of tubular fitting 20 is an actuating sleeve 31. The forward end 32 of sleeve 31 is inturned to engage the forward end of socket portion 21 to determine one limit of the longitudinal axial movement of sleeve 31, the inturned portion 32 providing an entrance for nipple portion 14 into socket portion 21. The rear end 33 of sleeve 31 is slidably supported on enlarged portion 22 of fitting 20, and is adapted to engage a lock ring 34 fixed to enlarged portion 22 to determine the other limit of axial movement of sleeve 31. As is clearly shown in Figs. 1 and 3, the range of movement of sleeve 31 is equal to the difference of the distances illustrated by reference characters *a* and *b*.

Figure 3:
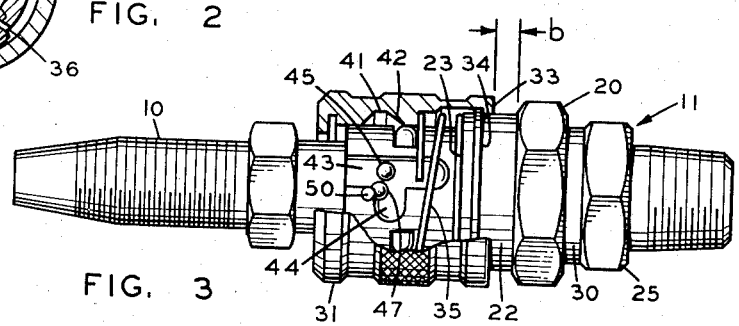
Fig. 3 is a side elevational view of the coupling showing the male and female members operatively connected but showing the actuating sleeve in an unlatched position.
Figure 4:
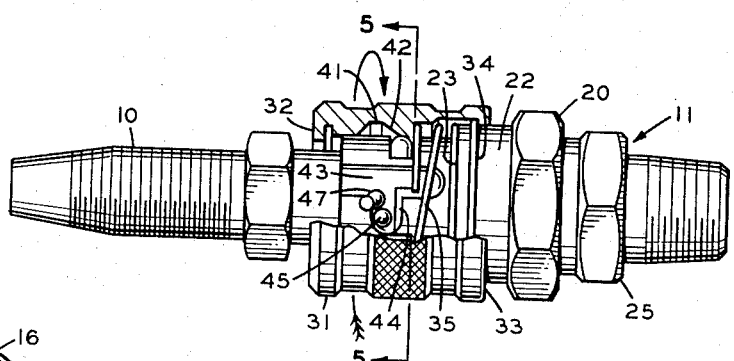
Fig. 4 is a side elevational view, partly in cross section, of the coupling showing the sleeve in a latched position.

A compression spring 35 is disposed operatively between the sleeve 31 and the socket fitting 20, one end of spring 35 abutting shoulder 23 and the opposite end a butting a shoulder on sleeve 31. The spring 35 tends to urge sleeve 31 in a forward direction to one limit of its axial slidable movement as illustrated in Figs. 3 and 4. Other functions and advantages of spring 35 will be described subsequently upon disclosure of other parts of the assembly.

Figure 2:
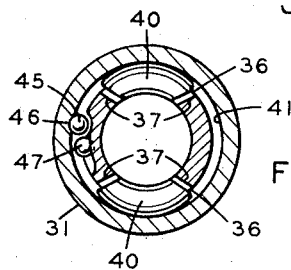
Fig. 2 is a cross sectional view of the female member as seen along line 2—2 of Fig. 1.
Figure 5:
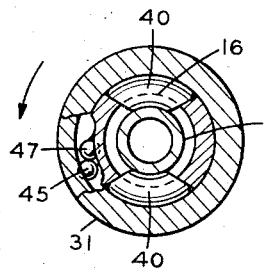
Fig. 5 is a cross sectional view of the coupling as seen along line 5—5 of Fig. 4.

Provided in socket portion 21 is a pair of opposed openings 36, each of which is defined by inwardly converging sides 37, as best shown in Fig. 2. An arcuate locking element or dog 40 is located in each opening 36. The openings 36 are dimensioned relative to the size of locking elements 40 to permit the locking elements 40 to move radially into and out of the socket portion 21. The sleeve 31 is provided with an internal peripheral recess 41 defined in part by a sloping shoulder 42. It will be seen that when sleeve 31 is moved to its rearmost position as illustrated in Figs. 1 and 2, the locking dogs 40 are capable of being moved out of socket portion 21 and into recess 41. When the sleeve 31 is released, the spring 35 urges the sleeve forwardly so that the sloping shoulder 42 engages the locking elements 40 and urges such elements 40 inwardly through openings 36 and into socket portion 21 as illustrated in Figs. 3–5.

The socket portion 21 is provided exteriorly with a T-shaped groove having a longitudinal groove portion 43 and a latch groove portion 44 communicating therewith. The longitudinal groove portion 43 is open at the end of socket portion 21 to permit and facilitate assembly of sleeve 31 and the latching mechanism to be described.

As is shown more clearly in Fig. 2, a ball 45 preferably formed of a hardened steel, is located rotatively mounted in a depression 46 provided in recess 41. The ball 45 is carried by sleeve 31 upon slidable movement of such sleeve, yet is free to rotate in depression 46.

When sleeve 31 is assembled over the socket portion 21, the ball 45 is moved into longitudinal groove portion 43 through its open end. The ball 45 is movable along longitudinal groove portion 43 in guiding sleeve 31 in its slidable axial movement between the limits illustrated in Figs. 1 and 3. The ball 45 is selectively movable into latch groove portion 44 upon rotation of sleeve 31.

Another ball 47, preferably formed of a hardened steel, is located at the forward corner of the entrance to latch groove portion 44. In securing ball 47 to socket portion 21, the ball 47 is located in a depression and the material of socket portion 21 (which is preferably brass) immediately adjacent such dimple is struck with a tool to provide a dimple 50 which peens the material of the socket portion over a portion of ball 47 to secure it in place. The ball 47 extends into the latch groove portion 44 to reduce the width of its entrance to approximately the size of ball 45.

When sleeve 31 is located in its forwardmost position as shown in Fig. 3, and ball 45 is located in longitudinal groove portion 43, the axis of ball 45 perpendicular to the longitudinal axis of the male and female members is located behind the corresponding axis of ball 47, and yet the balls 45 and 47 are located in overlapping relation, so that upon rotation of sleeve 31 the balls 45 and 47 will engage and ball 47 will serve as a bearing surface in moving ball 45 slightly rearwardly under loading of spring 35 through the entrance and into the latch groove portion 44. When located in latch groove portion 44, the ball 45 is urged forwardly into similar overlapping relation with ball 47 by the loading of spring 35 so as to preclude unintentional rotation of sleeve 31 and unintentional disengagement of ball 45 from latch groove portion 44.

It will be particularly noted that when ball 45 is located in latch groove portion 44 as shown in Fig. 4, the locking elements 40 are still urged and retained inwardly of socket portion 21. To enable the locking elements 40 to move radially outwardly of socket portion 21 and hence permit operative engagement or disengagement with nipple portion 14, the ball 45 must be moved along longitudinal groove portion 43 rearwardly of the entrance to latch groove portion 44, as is more clearly shown in Fig. 1.

It is thought that the operation and functional result of the coupling has become fully apparent from the foregoing detailed description of parts and assembly, but for completeness of disclosure it will be noted that when it is desired to connect the male member 10 operatively to the female member 11, the sleeve 31 is moved rearwardly to the position shown in Fig. 1, and then the nipple portion 14 is inserted into socket portion 21. When fully inserted, the groove 15 of nipple portion 14 is aligned with the locking elements 40. In order to lock the nipple portion 14 securely in place, the sleeve 31 is released to enable it to move longitudinally forward to the position shown in Fig. 3 under the compressive action of spring 35. Upon such movement of sleeve 31, the sloping shoulder 42 of recess 41 engages the locking elements 40 and cams such elements 40 inwardly of socket portion 21 and into the groove 15. In the forward position of sleeve 31, the locking elements engage the sleeve 31 and are precluded from moving outwardly of nipple groove 15. It is seen that ball 45 moves in longitudinal groove portion 43 to guide the sleeve 31 in its longitudinal axial movement incident to attachment and detachment of male member 10.

To preclude unintentional rearward movement of sleeve 31 and hence preclude unintentional detachment of male member 10, the sleeve 31 is rotated to move ball 45 into the latch groove portion 44 as explained previously. When ball 45 is located in latch groove portion 44, the sleeve 31 cannot be moved rearwardly a sufficient distance to cause detachment of male member 10.

When it is desired to detach male member 10 from female member 11, the sleeve 31 is rotated to move ball 45 out of latch groove portion 44 and into longitudinal groove portion 43. Then, the sleeve 31 may be moved axially rearwardly to the position shown in Fig. 1 to effect release of locking elements 40 from peripheral groove 15 of male member 10. It is seen that in this position the ball 45 is moved along longitudinal groove portion 43 rearwardly of the latch groove portion 44.

It will be particularly noted that the balls 45 and 47 constitute coacting bearing surfaces upon rotative movement of sleeve 31 into and out of latch position, and that because such balls 45 and 47 are of hardened steel there is no apparent wearing, thus a coupling is provided that has a long life expectancy of continuous use.

Although the invention has been described by making making detailed reference to a single preferred embodiment, such detail is to be understood in an instructive rather than in any restrictive sense, many variants being possible within the scope of the claims hereunto appended.

I claim as my invention:

1. A coupling comprising a male member including a nipple portion provided with a peripheral groove, a female member including a socket portion, radially movable locking elements carried loosely by the socket portion, a sleeve slidably mounted on said female member, the sleeve having a shoulder adapted to cam the locking elements into the socket portion, the socket portion being provided with a longitudinal groove and a latch groove communicating therewith, a ball fixed to said socket portion and located adjacent the juncture of said longitudinal and latch grooves, and a second ball carried by said sleeve and movable in said grooves, the first said ball serving as a bearing for the second ball when moved into and out of the latch groove.

2. A coupling comprising a male member including a nipple portion provided with a peripheral groove, a female member including a socket portion, radially movable locking elements carried loosely by the socket portion, a sleeve slidably mounted on the exterior of the female member, the sleeve having a shoulder, resilient means for urging the sleeve in one direction so that said shoulder cams the locking elements into the socket portion, the socket portion being provided exteriorly with a T-shaped groove including a longitudinal portion and a latch portion communicating therewith, a ball fixed to said socket portion and located adjacent the juncture of said groove portions, and a second ball carried by said sleeve and movable in said longitudinal and latch groove portions, the first said ball serving as a bearing for the second ball when moved into and out of said lock groove portion.

3. The combination and arrangement of elements as recited in claim 2, but further characterized in that the longitudinal groove portion opens at the end of the socket portion for permitting assembly of the second ball in said groove.

4. A coupling comprising a male member including a nipple portion provided with a peripheral groove, a female member including a socket portion, radially movable locking elements carried loosely by the socket portion, a sleeve slidably mounted on the exterior of the female member, the sleeve having a sloping shoulder, resilient means for urging the sleeve in one direction so that said shoulder cams the locking elements into the socket portion, the socket portion being provided exteriorly with a longitudinal groove and a latch groove communicating therewith, a ball fixed to said socket portion and located at one corner of the juncture of said longitudinal and latch grooves, and a second ball carried by said sleeve and movable in said longitudinal and latch grooves, the first said ball serving as a bearing for the second ball when said second ball is moved into and out of said lock groove.

5. The combination and arrangement of elements as recited above in claim 4, but further characterized in that the said first ball extends into the latch groove to reduce the width of its entrance to approximately the size of said second ball, and by the provision that the resilient means urges the sleeve in a direction to urge the second ball behind the first ball when said second ball is moved into said latch groove.

6. A coupling comprising a male member including a nipple portion provided with a peripheral groove, a female member including a socket portion, radially movable locking elements carried loosely by the socket portion, a sleeve slidably mounted on the female member, the sleeve having an integral recess adapted to receive the locking elements when moved out of said socket position, said sleeve having a sloping shoulder, resilient means disposed operatively between the female member and sleeve tending to urge the sleeve in one direction so that said shoulder cams the locking elements into the socket portion, the socket portion being provided with a longitudinal groove and a latch groove communicating therewith, a ball fixed to said socket portion and extending into said latch groove to reduce the width of its entrance, a second ball located in said recess, a depression in said sleeve for mounting and carrying said second ball, said second ball being movable in said longitudinal and latch grooves, the first said ball serving as a bearing for the second ball when moved into and out of said lock groove, the resilient means urging the second ball behind the first ball when moved into said latch groove.

7. A coupling comprising a male member including a niple portion provided with a peripheral groove, a female member including a socket portion, radially movable locking elements carried loosely by the socket portion, a sleeve slidably mounted on the female member, the sleeve having a shoulder, resilient means for urging the sleeve in a forward direction so that said shoulder cams the locking elements into the socket portion, the socket portion being provided with a longitudinal groove and and a latch groove communicating therewith, a first ball fixed to said socket portion and located at the forward corner of the entrance to said latch groove, and a second ball carried by said sleeve and movable in said longitudinal and latch grooves, the axis of the second ball perpendicular to the longitudinal axis of said members being located behind the corresponding axis of the first ball when said sleeve is located in its forwardmost position, the first said ball serving as a bearing for the second ball when moved into and out of said latch groove upon rotation of said sleeve.

8. The combination and arrangement of elements as recited above in claim 7, but further characterized in that the first ball extends into the latch groove to reduce the width of its entrance to approximately the size of said second ball, and in that the resilient means tends to urge the second ball in overlapping relation to the first ball when said second ball is moved into and out of said latch groove.

9. A coupling comprising a male member including a nipple portion provided with a peripheral groove, a female member including a socket portion, radially movable locking elements carried loosely by the socket portion, a sleeve slidably mounted within axial limits on said female member, the sleeve having an internal recess and a sloping shoulder, the locking elements being movable into said recess when said sleeve is disposed in its rearmost limit, resilient means tending to urge the sleeve forwardly so that said shoulder cams the locking elements into the socket portion, the socket portion being provided with a longitudinal groove and a latch groove communicating therewith, a ball fixed to said socket portion and located adjacent the juncture of said longitudinal and latch grooves, and a second ball carried by said sleeve and movable in said longitudinal and latch grooves, said second ball being located in overlapping relation with said first ball when said sleeve is located in its forwardmost position, the second ball being located in said longitudinal groove rearwardly of the entrance of said latch groove when the sleeve is in its rearmost limit, the first said ball serving as a bearing for the second ball when moved into and out of said latch groove upon rotation of said sleeve.

10. A coupling comprising a male member including a nipple portion provided with a peripheral groove, a female member including a socket portion, radially movable locking elements carried loosely by the socket portion, a sleeve slidably mounted on the exterior of the female member, means determining the limits of the axial movement of the sleeve, the sleeve being provided with a recess adapted to receive the locking elements when said sleeve is moved to its rearmost limits, the recess having a shoulder adapted to cam the locking elements into said socket portion when said sleeve is moved to its forwardmost limit, resilient means tending to urge said sleeve to its forwardmost limit, the socket portion being provided with a T-shaped groove having a longitudinal groove portion and a latch groove portion communicating therewith, a first ball fixed to said socket portion at the forward corner of the entrance to said latch groove portion, a second ball carried by and movable with said sleeve, said second ball being disposed in said T-shaped groove, being movable in said longitudinal groove portion upon axial movement of said sleeve within said limits, and being movable into said latch groove portion to preclude axial movement of the sleeve, the first ball serving as a bearing for the second ball upon movement into and out of said latch groove portion.

11. The combination and arrangement of elements as recited in claim 10, but further characterized in that the said first ball extends into said longitudinal and latch groove portions to reduce the width of the entrance to said latch groove portion to approximately the size of said second ball, whereby to assure a bearing between said balls upon movement of said second ball into said latch groove portion.

12. A coupling comprising a male member including a nipple portion provided with a peripheral groove, a female member including a socket portion, radially movable locking elements carried loosely by the socket portion, a sleeve slidably mounted on the exterior of the female member, means for determining the limits of axial movement of the sleeve, the sleeve being provided with a recess adapted to receive the locking elements when said sleeve is moved to its rearmost limit, the recess having a shoulder adapted to cam the locking elements into said socket portion when said sleeve is moved to its forwardmost limit, resilient means tending to urge said sleeve to said forwardmost limit, the socket portion being provided with a T-shaped groove having a longitudinal groove portion and a latch groove portion communicating therewith, a first ball fixed to said socket portion at the forward corner of the entrance of said latch groove portion, a second ball carried by and movable with said sleeve, said second ball being rotatively mounted by said sleeve and being disposed for rolling movement in said T-shaped groove, being movable in said longitudinal groove upon axial movement of said sleeve within said limits, and being movable in said latch groove portion to latch the sleeve against axial movement, the second ball being normally maintained in overlapping relation to the said first ball under loading of said resilient means when located in either of said groove portions so that the second ball engages the first ball as a bearing under loading of the resilient means upon movement into and out of said latch groove portion incident to sleeve rotation.

13. The combination and arrangement of elements as recited above in claim 12, but further characterized in that the second ball is located in said longitudinal groove portion rearwardly of the latch groove portion when said sleeve is moved to its rearmost limit to effect release of the locking elements.

14. A coupling comprising a male member including a nipple portion provided with a peripheral groove, a female member including a socket portion, radially movable locking elements carried loosely by the socket portion, a sleeve slidably mounted for axial and rotative movement on the exterior of said female member, the sleeve having an internal recess defined in part by a sloping shoulder, spring means disposed operatively between the female member and sleeve tending to urge the sleeve in a forward direction so that said shoulder cams the locking elements into the socket portion and peripheral groove, the socket portion being provided exteriorly with a T-shaped groove including a longitudinal groove portion and a latch groove portion communicating therewith, a ball fixed in socket portion and located at the forward corner of the entrance to said latch groove portion, a second ball carried by said sleeve and mounted for rotative movement, said second ball being movable with said sleeve and received in said T-shaped groove, the first ball extending into the latch groove portion to reduce the width of its entrance, the axis of the second ball perpendicular to the longitudinal axis of said members being located behind the corresponding axis of the first ball when said sleeve is located in its forwardmost position, and said balls being disposed in overlapping relation, said second ball being movable in said longitudinal groove portion upon axial movement of said sleeve, and being movable into said latch groove portion upon rotation of said sleeve so as to latch the sleeve against axial movement, the first ball serving as a bearing surface for the second ball under spring loading upon movement into and out of said latch groove portion, the spring means urging the second ball in overlapping relation to the first ball when said second ball is moved into said latch groove portion.

15. A coupling comprising a male member including a nipple provided with a peripheral groove, a female member including a socket portion adapted to receive said nipple portion, a detachable connection between said nipple portion and said socket portion including a sleeve slidably mounted upon said female member, the socket portion being provided with a T-shaped groove having a longitudinal groove portion and a latch groove portion communicating therewith, a first ball fixed to said socket portion at the entrance to said latch groove portion, a second ball mounted on and carried by the sleeve, said second ball being disposed and operable in said longitudinal groove portion upon axial movement of said sleeve, and being disposed and operable in said latch groove portion upon rotative movement of said sleeve so as to preclude axial movement of said sleeve.

16. The combination and arrangement of elements as recited above in claim 15, but further characterized by the provision of a resilient means between the female member and said sleeve tending to urge said sleeve in a direction to effect connection between the nipple portion and said socket portion, said second ball being normally located in said longitudinal groove portion under loading of said resilient means in overlapping relation to the first said ball so that the second ball engages the first ball as a bearing surface under loading of the resilient means upon rotative movement of said sleeve in moving the second ball into said latch groove portion, said resilient means urging the second ball in overlapping relation to the first ball when the second ball is located in said latch groove portion.

No references cited.